United States Patent Office 3,701,742
Patented Oct. 31, 1972

3,701,742
VINYL CHLORIDE POLYMERS AND METHOD OF PREPARING SAME
Dean E. Richardson, La Marque, Adolph A. Peterson III, Dickinson, and Harold P. Brady, Jr., Houston, Tex., assignors to Union Carbide Corporation, New York, N.Y.
No Drawing. Filed Oct. 29, 1970, Ser. No. 85,262
Int. Cl. C08f 11/09
U.S. Cl. 260—17 R
7 Claims

ABSTRACT OF THE DISCLOSURE

Vinyl chloride polymers having enhanced porosity and lower fisheye values have been prepared by aqueous suspension polymerization using a combination of hydroxypropyl methyl cellulose and hydroxyethyl cellulose as suspending agents.

BACKGROUND OF THE INVENTION

This invention pertains to vinyl chloride polymers and more particularly to the preparation of vinyl chloride polymers having enhanced porosity and lower fisheye values.

Vinyl chloride polymers and copolymers are used in industry in great quantities for the fabrication of flexible films, sheetings, fabric coatings and wire insulation. Among other properties they must lend themselves to plasticization with plasticizers such as dioctyl phthalate, diisodecyl phthalate, dioctyl sebacate, trioctyl phosphate, and the like. Accordingly, particle porosity is an important property of these resins since it determines the ability of the resin to absorb these liquid plasticizers in fabrication operations, such as calendering, molding and extrusion. In view of the fact that optimum resin-plasticizer ratios can vary widely depending on the fabrication process and end use of the fabricated articles, control of particle porosity in vinyl chloride resins is extremely important in their manufacture from the monomer by polymerization. Resins which absorb plasticizer readily and yield a sandy, free-flowing preblend are known as dry blend resins. Dry blendability of the vinyl chloride resin is a particularly important attribute inasmuch as it permits rapid blending of resin, plasticizer, stabilizer, filler and the like in equipment such as ribbon blenders, intensive mixers and the like, affording a free-flowing preblend which can readily be fed to calendars, extruders or other fabrication machinery.

It follows that the presence of hard, glassy, nonporous particles known as fisheyes in porous vinyl chloride resins is thereforehighly undesirable. Such particles do not absorb plasticizer and hence did not flux into the melt during processing. Accordingly, these particles appear in the finished articles as discrete and unpigmented gels. Critical applications require very low fisheye counts, usually less than 10 per square foot of film.

The aqueous suspension polymerization of vinyl chloride monomer alone or in conjunction with other copolymerizable comonomers has been extensively investigated. Many suspension stabilizers or agents have been used in such polymerization systems including natural polymeric agents such as starch, pectin, plant gums, gelatin, and the like; modified natural polymeric agents, as for example, derivatives of cellulose such as methyl cellulose, hydroxyethyl cellulose, carboxymethyl cellulose sodium salt, and the like; synthetic polymeric agents, such as, polyacrylic acid salts, polyvinyl alcohol, sulfonated styrene, polyethylene glycol esters, and the like; and inorganic agents such as kaolin, talcum, tricalcium phosphate, bentonite and the like.

It is well known in the art that by varying the suspending agent in a method for the polymerization of a vinyl monomer and particularly vinyl chloride, the physical and often the chemical properties of the resultant polymer are radically changed. Thus for example holding all other variables constant by merely exchanging one suspending agent for another, one may obtain a glassy polymer particle instead of a porous particle or vice versa. Other physical properties which may vary include the shape or geometry of the polymer particle formed, particle size, particle size distribution, clarity or conversely opacity of the polymer particle, thermal stability of the polymer particle, dielectric properties of the polymer particle and the shaped article fabricated therefrom, processability and handling characteristics of the polymer particles, and the like.

It is an object of this invention to provide vinyl chloride polymers having greater porosities than hitherto available.

It is another object of this invention to provide vinyl chloride polymers having reduced fisheye content in conjunction with enhanced porosity.

It is still another object to provide vinyl chloride polymers having excellent heat stability, processability and handling characteristics.

A further object of this invention is to provide vinyl chloride polymers which upon absorbing plasticizer readily yield a sandy, free-flowing preblend, suitable for use as a "dry blend resin."

Vinyl chloride resins meeting the above objectives have been obtained by an aqueous suspension polymerization process which comprises:

(A) Heating with agitation at a temperature of about 35 to 80° C. for at least 4 hours a mixture of:
(1) 100 parts by weight of vinyl chloride monomer,
(2) From 0 to about 20 parts of an ethylenically unsaturated hydrocarbon monomer which is copolymerizable with vinyl chloride,
(3) From about 0.02 to 0.2 parts of hydroxypropyl methyl cellulose,
(4) From about 0.05 to 0.5 parts of hydroxyethyl cellulose,
(5) From about 0.02 to 1.0 parts of a free radical vinyl polymerization initiator, and
(6) From about 150 to 400 parts of water; and (B) Recovering vinyl chloride polymer from the polymerization system.

The instant invention is applicable not only to the preparation of vinyl chloride homopolymers having enhanced porosity and a minimum of fisheyes but also to copolymers of vinyl chloride containing an ethylenically unsaturated hydrocarbon comonomer capable of undergoing copolymerization with vinyl chloride copolymerized therein. Exemplary of such comonomers are vinyl esters of an aliphatic monocarboxylic acid, said acid containing 1 to about 18 carbon atoms, such as, vinyl formate, vinyl acetate, vinyl propionate, vinyl pelargonate, vinyl laurate, vinyl stearate and the like; alkyl esters of acrylic or methacrylic acids, such as, methyl methacrylate, ethyl acrylate, butyl acrylate, lauryl methacrylate, and the like; and alpha-olefins such as ethylene, propylene, and the like.

The hydroxypropyl methyl cellulose suspending agents useful in the practice of this invention are commercial grades of this material (sold under the trademark Methocel HG) having methoxy contents ranging from about 19 to 24 weight percent, propylene glycol ether contents of about 4 to 12 weight percent, and molecular weights of about 10,000 to about 30,000. The hydroxyethyl cellulose suspending agents useful in this invention similarly are commercial grades of this material (sold under the trademark Cellosize) ranging in average molecular weight from about 10,000 to 4,400,000 and contain about 0.5 to 2.5 bonded equivalents of ethylene oxide per glucose anhydride unit.

Although about 0.02 to 0.2 part by weight per hundred parts of vinyl chloride of hydroxypropyl methyl cellulose can be used in this invention, it is preferred to use a range of about 0.02 to 0.1 part by weight.

The preferred amount of hydroxyethyl cellulose used in the practice of this invention ranges from about 0.1 to 0.3 part by weight although this amount can vary from about 0.05 to 0.5 part by weight.

From the point of view of convenience, it is preferred to add these suspending agents of the polymerization vessel in the form of aqueous solutions rather than in the dry state. Thus for example, a three percent aqueous solution of hydroxypropyl methyl cellulose having a standard viscosity of 50 centipoises when measured as a 2% solution in water at 20° C. may be used for the one suspending agent while a 2% aqueous solution of hydroxyethyl cellulose having a standard viscosity of 300 centipoises when measured as a 2% solution in water at 20° C. has been found to be a convenient form for using the other. The concentration of these aqueous solutions however is not critical and may vary considerably at the option of the user.

The general preparation and chemistry of cellulose derivatives is described in the Encyclopedia of Chemical Technology of R.E. Kirk and D.F. Othmer, vol. 3, pp. 383–391, the Interscience Encyclopedia Co., Inc. N.Y.C., 1949. The preparations of hydroxypropyl methyl cellulose and hydroxyethyl cellulose are described in the Encyclopedia of Polymer Science and Technology vol. 3, Interscience Publisher, N.Y.C. 1964, p. 497 and pp. 511–519 respectively.

While single derivatives of cellulose and also combinations of derivatives of cellulose have been used in the past as suspending agents for vinyl chloride polymerizations, such as, for example a mixture of methyl cellulose and hydroxyethyl cellulose, none of the various combinations employed up to the point of this invention have afforded vinyl chloride polymers having the high degree of porosity and short dryblend times evinced by the polymers obtained from the practice of the instant invention. While it is not known why the particular combination of hydroxypropyl methyl cellulose with hydroxyethyl cellulose produce these superior results, the phenomenon may be described as truly synergistic in that the properties of the vinyl chloride resins produced by the practice of this invention are superior to those produced with either hydroxypropyl methyl cellulose or hydroxyethyl cellulose alone as the suspending agent. For example as disclosed in U.S. 480,602 to M. J. Abercrombie et al. the use of hydroxyethyl cellulose alone as a suspending agent for the suspension polymerization of vinyl chloride affords high bulk density, i.e., low porosity vinyl resin which is the antithesis of the vinyl resins produced in the instant invention.

Free radical initiators which can be used herein include organic peroxides such as dicapryloyl peroxide, dilauroyl peroxide, dibenzoyl peroxide, acetyl cyclohexane sulfonyl peroxide, t-butyl peroxy pivalate and the like; azo compounds such as 2,2'-azobisisobutyronitrile, alpha, alpha'-azodicyclohexanecarbonitrile, azo - $\alpha,\gamma$-dimethylvaleronitrile, dimethyl-$\alpha,\alpha'$-azodiisobutyrate, and the like; dialkyl peroxy dicarbonates such as diiosopropyl peroxy dicarbonate, diisobutyl peroxy dicarbonate, di-n-butyl peroxy dicarbonate and the like.

The concentration of free radical polymerization initiators is preferably in the range of about 0.04 to 0.4 part per 100 parts by weight of vinyl chloride but as little as 0.02 part or as much as 1.0 part by weight or even higher can be used if desired.

The amount of water used in this process can vary between about 150 and 400 parts by weight or higher if desired per hundred parts by weight of vinyl chloride with 180 to 250 parts by weight being a preferred range. It is strongly preferred to use water containing as few impurities as possible. Distilled or deionized water are suitable.

The type of agitation required in this invention is not narrowly critical and is that commonly used in the art for the aqueous suspension polymerization of vinyl chloride monomer.

Although not necessarily required, chain transfer agents may be used if desired to control the molecular weight of the vinyl chloride polymers being produced. Suitable chain transfer agents include trichloroethylene, tetrachloroethylene, trichloroethane, carbon tetrachloride, and the like.

Small amounts of buffering or neutralization agents can be optionally employed such as sodium bicarbonate and the like.

Although polymerization temperatures in the range of about 35 to 80° C. can be employed, narrower specific ranges are preferred depending on the identity of the free radical polymerization initiator used. Thus for example a range of about 35 to 55° C. is preferred when using alkyl peroxy dicarbonates. When azo initiators are employed a range of about 55 to 70° C. is preferred. When peroxide initiators are used a range of about 60 to 80° C. is preferred.

The only criticality as to polymerization time is the lower limit of about 4 hours since this is the minimum time required for a practical conversion of monomer to polymer. Economic considerations dictate the upper time limit inasmuch as the polymerization rate slows down as monomer is consumed in the polymerization reaction but even extended periods of time will not materially effect the nature of the polymer produced.

Dry blendability can be easily and accurately determined using a commercially available instrument called a Brabender Plasticorder. This instrument is widely used for a variety of tests by polymer producers and users, and consists of a jacketed mixing chamber in which two horizontal mixing blades rotate at constant temperature. The mixing blades are driven by a constant speed electric motor which is connected so that the torque required to turn the blades is accurately measured and continuously recorded on a strip chart. To measure the dry blend time with a Brabender Plasticorder, the vinyl chloride polymer resin (200 grams) and calcium carbonate filler (84 grams) are added to the mixing chamber and thoroughly blended. Then a liquid diisodecyl phthalate plasticizer (103 grams) is added noting the time of addition. Torque immediately increases because of the initially pasty character of the mixture. After several minutes, the resin sorbs all of the plasticizer and the mix suddenly becomes dry, sandy, and free-flowing. At this point the torque decreases sharply to an equilibrium point. The elapsed time between the adding of the liquid plasticizer and the point of equilibrium dry blend torque is recorded as the dry blend time. Short dry blend times are obviously a desirable property of the resin tested. The test can be varied by changing the blending temperature, the plasticizer, or the ratio of resin to plasticizer, but relative results will be the same.

The actual porosity of the vinyl chloride polymer resins produced in this invention were also measured directly by using a Mercury Intrusion Porosimeter. This measurement is described in ASTM D–20 and involves placing a small sample of vinyl chloride resin in a chamber and covering the sample of resin with mercury. The pressure on the surface of the mercury is increased incrementally, and the volume of mercury in a reservoir communicating with that in the chamber corresponds to the volume of mercury forced into the pores of the resin. Thus the total pore volume can be read directly and knowing the wetting characteristics of mercury versus the resin, the average pore diameter can be calculated from the pressure and volume readings. For dryblend resins, larger pore diameters and greater total porosity are obviously the end desired.

The number of fisheyes in the resins produced was measured by first preparing a master batch consisting of 92.4 parts of diisoctyl phthalate, 6.1 parts of dibutyl tin dilaurate, 1.5 parts of mineral oil (Humble White Oil #180 USP) and a small amount of violet dye. 80 parts of this master batch was mixed in a Hobart mixer for 3 minutes with 0.13 parts of cadmium stearate and 170 parts of the vinyl chloride polymer resin to be tested. This mixed batch was then milled on a 2 roll mill at 170° C. and fluxed within 30 to 45 seconds to produce a sheet having a thickness of 10 mils. Milling was continued of the 10 mil sheet for 4 minutes after which the sheet was removed and cooled on a clean surface. A section 9½ x 7½" and placed over a light box. The fisheye count is reported as the number of clear windows (unpigmented particles) per square foot.

Inherent viscosity measurements were made in accordance with ASTM 1243, Method A.

The invention is further described in the examples which follow. All parts and percentages are by weight unless otherwise specified.

EXAMPLE 1

5,700 gallon autoclave, equipped with a Pfaudler retreat curve agitator was charged with 2700 gallons of deionized water. Agitation was started and 3.7 pounds of hydroxypropyl methyl cellulose was added a 2.5% aqueous solution. This hydroxypropyl methyl cellulose had molecular weight of about 21,000, a propylene glycol ether content of about 5 weight percent, and a methoxyl content of about 20 weight percent. There was then added 22.5 pounds of hydroxyethyl cellulose as a 3% aqueous solution. This hydroxyethyl cellulose (Cellosize WP 300) had a molecular weight of about 300,000 and about 1.9 bonded equivalents of ethylene oxide per glucose anhydride unit. This was followed by an addition of 1.0 lb. of sodium bicarbonate, 13,500 lbs. of vinyl chloride monomer and 29 lbs. of dilauroyl peroxide free radical initiator. The charge in the autoclave was then heated to about 55° C. with continued agitation and maintained at that temperature with agitation until the reaction pressure decreased about 10 p.s.i.g. This took about 8 hours of polymerization time after which the run was terminated and the resin recovered by centrifugation, washing and drying. The average apparent pore radius and total internal pore volume of the resultant resin which had an inherent viscosity of about 1.01 recorded in Table I show an improvement of 8.9% and 27.8% respectively over Control A described below.

CONTROL A

Example 1 was repeated with the exception that 5 lbs. of methyl cellulose was added as a 2.5 percent aqueous solution to the autoclave instead of the 3.7 lbs. of hydroxypropyl methyl cellulose. This methyl cellulose had an average molecular weight of about 15,000 and a methoxyl content of about 30 weight percent. The average apparent pore radius and total internal pore volume of this resin were also recorded in Table I.

TABLE I

| | Average apparent pore radius, microns | Total internal pore volume, cc./g. |
|---|---|---|
| Example 1 | 0.429 | 0.258 |
| Control A | 0.394 | 0.202 |

EXAMPLE 2

A 600 gallon autoclave equipped with a Pfaudler retreat curve agitator was charged with 2,440 pounds of deionized water. The water was agitated and there was then added to the autoclave 0.3465 pounds of hydroxypropyl methyl cellulose as a 2.14% aqueous solution. This hydroxypropyl methyl cellulose had a molecular weight of about 21,000 and a propylene glycol ether content of about 5 weight percent and a methoxyl content of about 20%. This was followed by 2.1735 pounds of hydroxyethyl cellulose added as the 3.0% aqueous solution. This hydroxyethyl cellulose (Cellosize WP–300) had an average molecular weight of about 300,000. There was then added to the autoclave 45 grams of sodium bicarbonate, 572 grams of dilauroyl peroxide free radical initiator and 1260 pounds of vinyl chloride monomer. The charge was heaeted to 65° with continued agitation and maintained at this temperature for 6.6 hours by which time an autoclave pressure drop of 5 p.s.i.g. had taken place. The resin was then blown down from the autoclave recovered by centrifugation, washed and dried. The dryblend time of the resin obtained is shown in Table II. The inherent viscosity of the product resin was about 0.77.

CONTROL B

Example 2 was repeated with the exception that 0.63 pounds of methyl cellulose added as a 2.9% aqueous solution was used in place of the hydroxypropyl methyl cellulose. The methyl cellulose had an approximate molecular weight of 15,000 and a methoxyl content of about 20 weight percent. Dryblend time of the resin obtained is recorded in Table II.

TABLE II

| | Dryblend time, minutes | Improvement over control B, percent |
|---|---|---|
| Example 2 | 5.4 | 19.4 |
| Control B | 7.0 | |

EXAMPLE 3

A 600 gallon autoclave equipped with a Pfaudler retreat curve agitator was charged with 2,367 pounds of deionized water. There was then added to the autoclave with agitation 0.346 pounds of hydroxypropyl methyl cellulose as a 2.5% aqueous solution. This hydroxypropyl methyl cellulose had a molecular weight of about 21,000, a hydroxypropyl ether content of about 5 weight percent and a methoxyl content of about 20 weight percent. The autoclave was then additionally charged with 2.0 pounds of hydroxyethyl cellulose (Cellosize WP–300) as a 2.54% aqueous solution. This hydroxyethyl cellulose had a average molecular weight of about 300,000 and about 1.9 bonded equivalents of ethylene oxide per glucose anhydride unit. There was then added 133 grams of sodium bicarbonate, 0.65 pounds of acetyl cyclohexane sulfonyl peroxide (Lupersol 228), free radical initiator and 1,330 pounds of vinyl chloride monomer. The charge was heated to 48° C. with agitation and maintained at that temperature for 6 hours. The run was then terminated by blowing down and dewatering, washing and drying the resin. The dryblend time measured with a Brabender Plasticorder is recorded in Table III. The inherent viscosity of the product resin was about 1.20.

CONTROL C

Example 3 was repeated with the exception that 0.615 pounds of methyl cellulose (Methocel MC-15) added as a 3% aqueous solution was used in place of the hydroxypropyl methyl cellulose. This methyl cellulose had a molecular weight of about 15,000 and a methoxyl content of about 30 weight percent. The dryblend time of the resin recovered was measured with a Brabender Plasticorder and recorded in Table III.

TABLE III

|  | Dryblend time, minutes | Improvement over control C, percent |
|---|---|---|
| Example 3 | 4.4 | 17.0 |
| Control C | 5.3 |  |

EXAMPLE 4

A 600 gallon autoclave equipped with a Pfaudler retreat curve agitator was charged with 2,600 pounds of deionized water followed by a mixture of 0.42 pound of hydroxypropyl methyl cellulose as a 2 percent aqueous solution and 1.12 pounds of hydroxyethyl cellulose added as a 2.96 percent solution. The hydroxypropyl methyl cellulose had an average molecular weight of 26,000 a hydroxypropyl ether content of about 8 weight percent, and a methoxyl content of about 20 weight percent. The hydroxyethyl cellulose had a molecular weight of about 300,000 (Cellosize WP-300) and about 1.9 bonded equivalents of ethylene oxide per glucose anhydride unit. There was then added with agitation 5.74 pounds of trichloroethylene, 1400 pounds of vinyl chloride monomer, and 10.9 pounds of dilauroyl peroxide free radial initiator. The autoclave was heated to 71° C. and polymerization was continued until there was a pressure drop of about 10 p.s.i.g. The total polymerization time was about 6 hours. The resin was recovered by blowing down, dewatering and drying. The dryblend time of this resin measured with a Brabender Plasticorder was found to be 5.8 minutes, a satisfactory value. The resin was substantially free of glassy, non-porous particles and had an inherent viscosity of about 0.63.

CONTROL D

Example 4 was repeated with the exception that the mixture of hydroxypropyl methyl cellulose and hydroxyethyl cellulose was replaced with 1.12 pounds of hydroxypropyl methyl cellulose alone added as a 2% aqueous solution. This hydroxypropyl methyl cellulose had a molecular weight of about 26,000, a hydroxypropyl ether content of about 8% and a methoxyl content of about 20%. The resin thus obtained had a dryblend time of 6.5 minutes which is inferior to Example 4. The resin was additionally undesirable in that it contained a substantial fraction of glassy, non-porous particles which are objectionable in a vinyl resin used for obtaining homogeneous dryblends.

EXAMPLE 5

Example 1 was repeated with the exception that the polymerization was carried out at a temperature of about 48° C. and the dilauroyl peroxide free radical initiator was replaced by 4.7 pounds of diisopropyl peroxy dicarbonate to permit the lower polymerization temperature. The vinyl resin thus obtained was analyzed for fisheyes according to the test described supra and showed a value of 2 fisheyes per square foot of film.

CONTROL E

Control A was repeated with the exception that the polymerization was carried out at 48° C. and the dilauroyl peroxide free radical initiator was replaced by 4.7 pounds of isopropyl peroxy dicarbonate. The fisheye analysis of the resin thus obtained showed a value of 34 fisheyes per square foot of film.

EXAMPLE 6

A 600 gallon autoclave equipped with a Pfaudler retreat curve agitator was charged with 2,520 pounds of deionized water followed by 0.588 pound of hydroxypropyl methyl cellulose, as a 2.85% aqueous solution, and 2.352 pounds of hydroxyethyl cellulose as a 3.0% aqueous solution with agitation. The hydroxypropyl methyl cellulose had a molecular weight of about 21,000, a propylene glycol ether content of about 5 weight percent and a methoxyl content of about 20 weight percent. The hydroxyethyl cellulose had a molecular weight of about 300,000 and about 1.9 bonded equivalents of ethylene oxide per glucose anhydride unit. There was then added 1,680 pounds of vinyl chloride monomer and 305 grams of tertiary butyl peroxy pivalate free radical polymerization catalyst. The autoclave was heated to 65°, with continued agitation, and maintained at that temperature for about 4.5 hours until a pressure drop of about 5 p.s.i.g. had taken place. The polyvinyl chloride was removed from the autoclave, washed and dried. This product had an inherent viscosity of about 0.77 and a dryblend time of 7.1 minutes which is a satisfactory value for a resin made with tertiary-butyl peroxy pivalate catalyst.

CONTROL F

Example 6 was repeated with the exception that the amount of hydroxypropyl methyl cellulose used was decreased from 0.588 pound to 0.252 pound, that is, from 0.03 part per hundred of vinyl chloride monomer to 0.015 part per hundred of vinyl chloride monomer. The inherent viscosity of the polyvinyl chloride thus produced also had an inherent viscosity of about 0.77 but the dryblend time was much greater than for the product from Example 6, namely, 18.0 minutes. This comparison sharply demonstrates the criticality of the concentrations of hydroxypropyl methyl cellulose required in the practice of this invention.

Although the invention has been described in its preferred form with a certain degree of particularity, it is understood that the present disclosure has been made only by way of example, and that numerous changes can be made without departing from the spirit and scope of the invention.

What is claimed is:
1. Method of preparing vinyl chloride polymers having enhanced porosity which comprises:
   (A) heating an aqueous suspension consisting essentially of:
      (1) 100 parts by weight of vinyl chloride monomer,
      (2) from 0 to about 20 parts by weight of an ethylenically unsaturated organic comonomer copolymerizable with vinyl chloride selected from the group consisting of vinyl esters of aliphatic monocarboxylic acids containing 1 to 18 carbon atoms, alkyl esters of acrylic or methacrylic acids and alpha-olefins,
      (3) from about 0.02 to 0.2 part by weight of hydroxypropyl methyl cellulose,
      (4) from about 0.05 to 0.5 part by weight of hydroxyethyl cellulose,
      (5) from about 0.02 to 1.0 part by weight of a free radical vinyl polymerization initiator,
      (6) from about 150 to 400 parts by weight of water, at a temperature of about 35 to 80° C. for at least 4 hours, and
   (B) recovering vinyl chloride polymer from the suspension.
2. Method claimed in claim 1 wherein the free radical vinyl polymerization initiator is dilauroyl peroxide and the temperature is in the range of about 55 to 80° C.

3. The method claimed in claim 1 wherein the free radical vinyl polymerization initiator is acetyl cyclohexane sulfonyl peroxide.

4. Method claimed in claim 1 wherein the free radical polymerization catalyst is diisopropyl peroxy dicarbonate.

5. Method claimed in claim 1, wherein the free radical polymerization catalyst is tertiary-butyl peroxy pivalate.

6. Method claimed in claim 1 wherein the range of hydroxypropyl methyl cellulose is about 0.02 to 0.1 part by weight and the range of hydroxyethyl cellulose is about 0.1 to 0.3 part by weight.

7. Method claimed in claim 1 wherein the ethylenically unsaturated organic comonomer is vinyl acetate.

References Cited
UNITED STATES PATENTS

| | | | |
|---|---|---|---|
| 2,827,443 | 3/1958 | Rector et al. | 260—17 R |
| 3,205,204 | 9/1965 | Heckmaier et al. | 260—87.1 |
| 3,375,238 | 3/1968 | Bauer et al. | 260—92.8 W |
| 3,499,850 | 3/1970 | Kinzie | 260—17 R |
| 3,558,578 | 1/1971 | Kraft et al. | 260—87.1 |

WILLIAM H. SHORT, Primary Examiner

L. M. PHYNES, Assistant Examiner

U.S. Cl. X.R.

260—86.3, 87.1, 87.5 C, 92.8 W